United States Patent
Goto et al.

(10) Patent No.: US 11,453,686 B2
(45) Date of Patent: Sep. 27, 2022

(54) (METH)ACRYLIC-MODIFIED SILICONE MACROMONOMER

(71) Applicant: SHIN-ETSU CHEMICAL CO., LTD., Tokyo (JP)

(72) Inventors: Tomoyuki Goto, Annaka (JP); Yoshihito Osawa, Annaka (JP); Yukio Morimoto, Tokyo (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 421 days.

(21) Appl. No.: 16/498,975

(22) PCT Filed: Mar. 29, 2018

(86) PCT No.: PCT/JP2018/013087
§ 371 (c)(1),
(2) Date: Sep. 27, 2019

(87) PCT Pub. No.: WO2018/181645
PCT Pub. Date: Oct. 4, 2018

(65) Prior Publication Data
US 2021/0107926 A1      Apr. 15, 2021

(30) Foreign Application Priority Data
Mar. 29, 2017   (JP) .................. JP2017-064193

(51) Int. Cl.
*C07F 7/08*     (2006.01)
*C08F 230/08*   (2006.01)
*C08G 77/20*    (2006.01)
*C09D 5/16*     (2006.01)
*C09D 143/04*   (2006.01)

(52) U.S. Cl.
CPC ........ *C07F 7/0838* (2013.01); *C08F 230/085* (2020.02); *C08G 77/20* (2013.01); *C09D 5/1675* (2013.01); *C09D 143/04* (2013.01)

(58) Field of Classification Search
CPC .... C07F 7/0838; C08F 230/085; C08G 77/20; C09D 5/1675; C09D 143/04
See application file for complete search history.

(56) References Cited

U.S. PATENT DOCUMENTS

| | | | | |
|---|---|---|---|---|
| 5,183,912 A | * | 2/1993 | Okawa | C08G 77/045 556/439 |
| 5,658,965 A | * | 8/1997 | Manzouji | C08F 290/068 522/170 |
| 6,306,992 B1 | * | 10/2001 | Yoshitake | C07F 7/0838 526/279 |
| 7,317,117 B2 | * | 1/2008 | Nakamura | C07F 7/0838 556/443 |
| 8,168,735 B2 | * | 5/2012 | Ichinohe | G02B 1/043 526/321 |
| 8,263,720 B1 | * | 9/2012 | Salamone | C09J 143/04 424/443 |
| 9,085,651 B2 | * | 7/2015 | Zhou | C08F 283/124 |
| 2004/0198938 A1 | * | 10/2004 | Nakamura | C07F 7/0838 526/279 |
| 2006/0258772 A1 | | 11/2006 | Sugihara et al. | |
| 2010/0063222 A1 | * | 3/2010 | Oikawa | C08F 290/068 528/37 |
| 2012/0202076 A1 | | 8/2012 | Ehara et al. | |
| 2012/0279922 A1 | * | 11/2012 | Haensel | B01D 67/009 210/489 |
| 2014/0135408 A1 | * | 5/2014 | Wang | C08G 77/38 556/439 |
| 2015/0376395 A1 | * | 12/2015 | Tao | C08L 25/04 525/85 |
| 2017/0088564 A1 | * | 3/2017 | Iyer | C08F 130/08 |
| 2018/0051179 A1 | * | 2/2018 | Katsumata | C09D 133/14 |
| 2020/0010697 A1 | * | 1/2020 | Taniguchi | C09D 143/04 |
| 2020/0055990 A1 | * | 2/2020 | Goto | C08L 83/04 |

FOREIGN PATENT DOCUMENTS

| | | | |
|---|---|---|---|
| EP | 2489711 A1 | | 8/2012 |
| JP | 2004-300410 A | | 10/2004 |
| JP | 2012-167185 A | | 9/2012 |
| JP | 2014-210871 A | | 11/2014 |
| JP | 2014210871 A | * | 11/2014 |
| JP | 2017-065457 | * | 3/2017 |

(Continued)

OTHER PUBLICATIONS

International Search Report (PCT/ISA/210) issued in PCT/JP2018/013087, dated Jun. 19, 2018.
Written Opinion (PCT/ISA/237) issued in PCT/JP2018/013087, dated Jun. 19, 2018.
Extended European Search Report, dated Nov. 30, 2020, for European Application No. 18778166.1.
Gelest Inc., "Reactive Silicones: Forging New Polymer Links," https://www.researchgate.net/publication/275343846_Reactive_Silicones_Forging_New_Polymer_Links, 2004 (Jan. 1, 2004), pp. 1-56 (total 59 pages), XP002470135.

*Primary Examiner* — Alexander R Pagano
(74) *Attorney, Agent, or Firm* — Birch, Stewart, Kolasch & Birch, LLP

(57) ABSTRACT

The present invention aims to provide a (meth)acrylic-modified silicone macromonomer, which may be used as a raw material for a (meth)acrylic copolymer capable of forming a coating having excellent antifouling properties and surface smoothness.

A (meth)acrylic-modified silicone macromonomer of formula (b1) is provided, which has 1 to 80 branches attached to a linear polysiloxane backbone and the branch has a (poly)oxyalkylene structure of the formula —$(C_aH_{2a}O)_b$— and a (meth)acryloyl group at a terminal. The (meth)acrylic-modified silicone macromonomer is a raw material for a polymer used in an antifouling paint.

11 Claims, No Drawings

(56) References Cited

FOREIGN PATENT DOCUMENTS

| WO | WO-2006125731 A1 | * | 11/2006 | ........... C08F 290/068 |
| WO | WO-2009029438 A1 | * | 3/2009 | ............ C09J 7/0296 |
| WO | WO 2011/046087 A | | 4/2011 | |
| WO | WO 2012/111286 A | | 8/2012 | |
| WO | WO-2012111286 A1 | * | 8/2012 | ........... C08F 290/148 |
| WO | WO 2016/002670 A1 | | 1/2016 | |
| WO | WO-2016002670 A1 | * | 1/2016 | ............. B32B 27/30 |

* cited by examiner

(METH)ACRYLIC-MODIFIED SILICONE MACROMONOMER

TECHNICAL FIELD

The present invention relates to a (meth)acrylic-modified silicone macromonomer, in particular, such which may be used as a raw material for a polymer for use in antifouling paints.

BACKGROUND ART

Conventionally, marine structures and ships are coated with an antifouling paint for the purpose of preventing attachment of marine organisms, which may cause surface corrosion or reduce a cruising speed. One known type of antifouling paints is a self-polishing antifouling paint, which typically comprises a hydrolysable resin and an antifouling agent. On a surface to which this type of antifouling paint is applied, the paint dissolves gradually and moves from the surface into the seawater, continuously exposing a fresh surface containing the antifouling agent, so that the antifouling effect is attained for a prolonged period of time. As examples of such antifouling paints, Patent Literature 1 discloses a paint composition comprising a copolymer comprising a structural unit derived from a siloxane-containing polymerizable monomer and a structural unit derived from a polymerizable monomer containing a divalent metal atom, and Patent Literature 2 discloses an antifouling paint composition comprising a hydrolysable resin having a siloxane-containing group and a triorganosilyloxycarbonyl group.

Even though these paint compositions comprising a copolymer derived from a siloxane-containing polymerizable monomer gives a coating having excellent antifouling effects, they have a problem in that the coating has a low level of surface smoothness.

LIST OF THE PRIOR ART

Patent Literatures

Patent Literature 1: JP 2004-300410-A
Patent Literature 2: WO 2011/046087-A

SUMMARY OF THE INVENTION

The present invention aims to provide a (meth)acrylic-modified silicone macromonomer, which may be used as a raw material for a (meth)acrylic copolymer capable of forming a coating having excellent antifouling properties and surface smoothness.

The present invention provides a (meth)acrylic-modified silicone macromonomer of the following formula (b1):

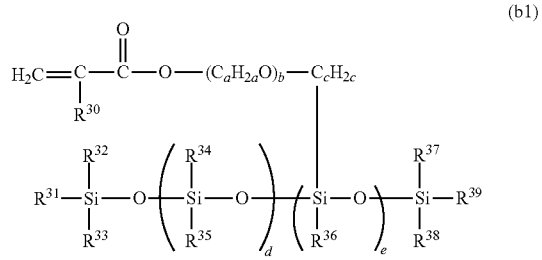

(b1)

wherein $R^{30}$ is a hydrogen atom or a methyl group; a is an integer of 2 to 5; b is an integer of 0 to 50; c is an integer of 0 to 18; d is an integer of 1 to 1,000; e is an integer of 1 to 80; and $R^{31}$-$R^{39}$ are, independently from each other, a substituted or unsubstituted monovalent hydrocarbon group having no (meth)acrylic group, or an alkoxy group.

The (meth)acrylic-modified silicone macromonomer according to the invention may be used as a raw material for a (meth)acrylic copolymer. It is particularly useful as a raw material for a (meth)acrylic copolymer used as a polymer in an antifouling paint to give an antifouling coating that exhibits excellent antifouling properties and surface smoothness.

DETAILED DESCRIPTION OF THE PREFERRED EMBODIMENTS

The (meth)acrylic-modified silicone macromonomer according to the invention is represented by the formula (b1) shown above, and will be described below in more detail.

In formula (b1), $R^{30}$ is a hydrogen atom or a methyl group, and a is an integer of 2 to 5, preferably 2 to 4 in view of the availability of a starting material.

In formula (b1), b is an integer of 0 to 50, preferably an integer of 0 to 30, more preferably 0 or 1 to 10, and especially preferably 0 or 1 to 5. If a compound having b of greater than 50 is used as a raw material for an antifouling paint polymer, the resulting coating may be too hydrophilic, or may have reduced water resistance due to a decreased content of the silicone moiety.

In formula (b1), c is an integer of 0 to 18, preferably 2 or 3, particularly 3, in view of the availability of a starting material.

In formula (b1), d is an integer of 1 to 1,000, preferably an integer of 1 to 200, more preferably an integer of 1 to 100, and especially preferably an integer of 1 to 60. If d exceeds 1,000, the macromonomer may have reduced compatibility with other polymerizable monomer(s) used in the synthesis of the polymer.

In formula (b1), e is an integer of 1 to 80, preferably an integer of 1 to 10, more preferably an integer of 1 to 5, and especially preferably an integer of 1 to 3. The subscript "e" denotes the number of (meth)acrylic groups, that is, the number of polymerizable groups essential for polymerization with other polymerizable monomers. If e exceeds 80, the resulting polymer may show a very low solubility.

In formula (b1), d+e is preferably from 2 to 1,000, more preferably from 2 to 150, and especially from 2 to 100.

In a preferable embodiment of the invention, e is 2 to 5, preferably 2 to 4, more preferably 2 or 3, and especially preferably 2. By the use of a compound having e in the above-mentioned range as a raw material, a polymer is obtained which has excellent coating hardness, water resistance and drying property. Preferably, the compound is further characterized in that a is an integer of 2 to 4, b is an integer of 0 to 10, c is 3, and d is an integer of 1 to 100.

In another preferable embodiment of the compound of formula (b1), e is 1 and b is an integer of 1 to 10. More preferably, a is an integer of 2 to 4, c is 3, and d is an integer of 1 to 100. By the use of such a compound as a raw material, a polymer is obtained which has excellent antifouling properties.

$R^{31}$-$R^{39}$ are, independently from each other, a substituted or unsubstituted monovalent hydrocarbon group having no (meth)acrylic group, or an alkoxy group. As used herein, the term "(meth)acrylic group" means an acryloyloxy or methacryloyloxy group.

The substituted or unsubstituted monovalent hydrocarbon group is preferably a substituted or unsubstituted monovalent hydrocarbon group having 1 to 18 carbon atoms, and more preferably an unsubstituted monovalent hydrocarbon group having 1 to 8 carbon atoms. The unsubstituted monovalent hydrocarbon group may have unsaturated bond(s). Examples thereof include alkyl groups, such as methyl, ethyl, propyl, butyl, pentyl and hexyl groups; cycloalkyl groups, such as a cyclohexyl group; aryl groups, such as phenyl, tolyl and naphthyl groups; aralkyl groups, such as benzyl, phenylethyl and phenylpropyl groups; and alkenyl groups, such as vinyl and allyl groups. Examples of the substituted monovalent hydrocarbon group include those groups in which a part or all of the hydrogen atoms each bonded to a carbon atom of the aforementioned groups are substituted with a halogen atom, such as a fluorine or chlorine atom. The monovalent hydrocarbon group may have an intervening oxygen atom(s).

The alkoxy group preferably has 1 to 6 carbon atoms, and more preferably 1 to 4 carbon atoms. Examples of the alkoxy group include methoxy, ethoxy, propoxy, 1-methylethoxy, 1-methylpropoxy, 2-methylpropoxy, pentyloxy, 3-methylbutyloxy, hexyloxy, cyclohexyloxy, and phenoxy groups.

Among these, it is especially preferable that $R^{31}$-$R^{39}$ are, independently from each other, methyl, phenyl, methoxy or ethoxy group, in view of the ease of synthesis.

In formula (b1) above, the siloxane units in the parentheses with the subscript d and the siloxane units in the parentheses with the subscript e may be arranged at random or in blocks. The groups denoted by $R^{30}$-$R^{39}$ are independent from each other, and may be the same or different.

The compound of formula (b1) may be prepared in any method known in the art, and there is no particular limitation on the method of its synthesis. For instance, the compound may be prepared by any of the synthesis methods (1) to (4) described below. The resulting compound typically has distribution in the structures, and b, d and e may be each an average value per molecule.

(1) A method for the synthesis by an equilibration reaction among a siloxane oligomer of the following formula (A1), a cyclic siloxane of the following formula (B1), and a siloxane of the following formula (C1).

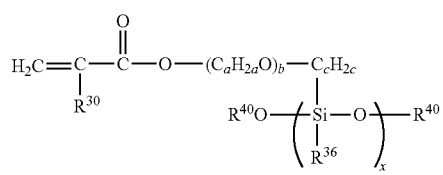
(A1)

wherein x is an integer of 1 to 100, $R^{40}$ is a monovalent hydrocarbon group having 1 to 8 carbon atoms, and $R^{30}$, $R^{36}$, a, b and c are as defined above.

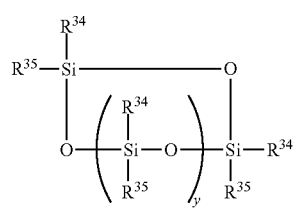
(B1)

wherein y is an integer of 1 to 5, and $R^{34}$ and $R^{35}$ are as defined above.

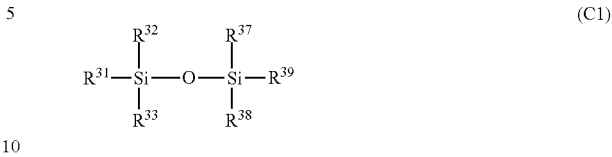
(C1)

wherein $R^{31}$-$R^{33}$ and $R^{37}$-$R^{39}$ are as defined above.

(2) A method by reacting a siloxane of formula (A2) shown below with (meth)acryloyl chloride.

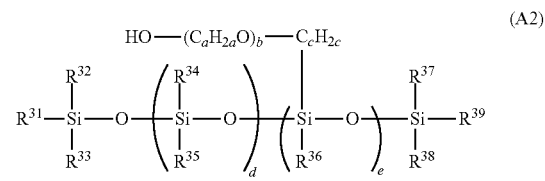
(A2)

wherein $R^{31}$-$R^{39}$ and a-e are as defined above.

(3) A method by a hydrosilylation between a hydrogensiloxane of formula (A3) and a compound of formula (B3), each shown below, in the presence of a platinum catalyst.

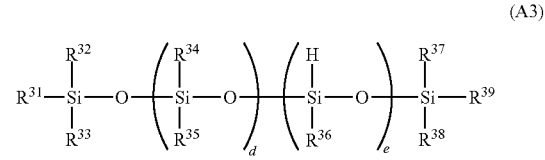
(A3)

wherein $R^{31}$-$R^{39}$, d and e are as defined above.

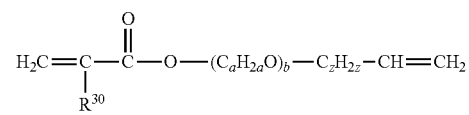
(B3)

wherein z is an integer of 0 to 16, and $R^{30}$, a and b are as defined above.

(4) A method by a dehydrogenation of the hydrogensiloxane of formula (A3) shown above and a compound of formula (B4) shown below, in the presence of a platinum catalyst.

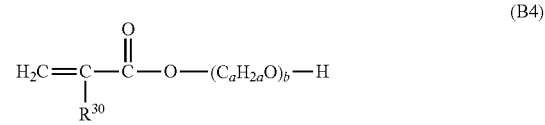
(B4)

wherein $R^{30}$, a and b are as defined above.

A reaction temperature and time in each of the methods described above may be suitably set in a manner known in the art. The reaction temperature is preferably in the range of 0 to 100° C., and the reaction time is preferably in the range of 1 to 20 hours. The reaction may be carried out using a suitable solvent in which the starting compounds are soluble. For instance, 2-propyl alcohol or toluene may be used as the solvent. The platinum catalyst may be any conventional one known in the art.

A polymerization inhibitor may be used, if necessary, in each of the aforementioned reactions. The polymerization inhibitor may be any compound conventionally used for (meth)acrylic compounds. For example, phenolic polymerization inhibitors, such as hydroquinone, hydroquinone monomethyl ether, 2-t-butylhydroquinone, 4-methoxyphenol, and 2,6-di-t-butyl-4-methylphenol (BHT), may be used. These polymerization inhibitors may be used alone or in combination. Although there is no particular limitation on the amount of the polymerization inhibitor, the amount of the polymerization inhibitor is preferably from 5 to 500 ppm, more preferably from 10 to 200 ppm, relative to the mass of the compound to be obtained.

The (meth)acrylic-modified silicone macromonomer according to the invention may be used as a raw material for a (meth)acrylic copolymer. This is particularly useful as a raw material (i.e., monomer) for a polymer for use in antifouling paints. The (meth)acrylic-modified silicone macromonomer according to the invention may be of one and the same structure, or may have a structural distribution (i.e., a mixture of compounds having different values of b, d and e), and both may be used in polymerization.

EXAMPLES

The invention will be further described with reference to the following Examples and Reference Example, which should not be construed to limit the scope of the present invention.

It is noted that viscosities were measured at 25° C. with a Cannon-Fenske capillary viscometer, and refractive indices were measured at 25° C. with a digital refractometer, RX-7000α (Atago Co. Ltd.). $^1$H-NMR analyses were conducted with JOEL ECX500II (JEOL Ltd.), using CDCl$_3$ as a solvent for measurement. Solid contents (mass %) were determined from masses before and after drying a sample in a hot air dryer at 105° C. for 2 hours, according to the following equation:

solid content (mass %)=(mass after the drying)×100/(mass before the drying)

Reference Example 1

<Preparation of Methacrylic-Modified Silicone Macromonomer (b-1)>

A one-liter, four-neck flask, fitted with a condenser and a thermometer, was charged with 221 g of 1,1,1,3,3,5,5,7,7,7-decamethyltetrasiloxane, 264 g of 1,3,3,5,5,7,7-octamethylcyclotetrasiloxane, and 265 g of a 3-methacryloyloxypropyl methyldimethoxysilane oligomer (viscosity: 80 mm$^2$/s). Then, 1.20 g of trifluoromethanesulfonic acid was added and allowed to react at 90° C. for 7 hours. After completion of the reaction, the liquid temperature was lowered to 40° C., followed by sequential addition of 0.60 g of water, 12 g of sodium hydrogen carbonate and 12 g of sodium sulfate. After stirred for 30 minutes, solids were removed by filtration. Then, 0.27 g of BHT was added, and low-boiling components were removed over 5 hours at 100° C./15 torr, while blowing nitrogen gas containing 4% oxygen. The product thus obtained had a yield of 590 g, a viscosity of 19 mm$^2$/s, and a refractive index of 1.4239. The $^1$H-NMR analysis confirmed that the compound thus obtained was a methacrylic-modified silicone macromonomer of formula (b-1) shown below.

The $^1$H-NMR data were as follows.
$^1$H-NMR: δ −0.10-0.21 (m, 66H), 0.41-0.58 (m, 4H), 1.59-1.75 (m, 4H), 1.87-1.93 (s, 6H), 4.01-4.09 (m, 4H), 5.49-5.54 (s, 2H), 6.04-6.09 (s, 2H)

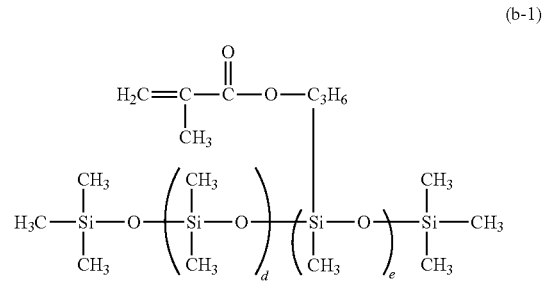

(b-1)

wherein d is 7 on average, and e is 2 on average.

Example 1

<Preparation of Methacrylic-Modified Silicone Macromonomer (b-2)>

The procedures of Example 1 were repeated, except that 131 g of a 3-(methacryloyloxyethoxy)propyl methyldimethoxysilane oligomer (viscosity: 130 mm$^2$/s) was used in place of 3-methacryloyloxypropyl methyldimethoxysilane, and that the amounts of the starting materials were changed to 178 g for 1,1,1,3,3,5,5,7,7,7-decamethyltetrasiloxane and 423 g for 1,1,3,3,5,5,7,7-octamethylcyclotetrasiloxane. The product thus obtained had a yield of 605 g, a viscosity of 23 mm$^2$/s, and a refractive index of 1.4150. $^1$H-NMR analysis confirmed that the compound thus obtained was a methacrylic-modified silicone macromonomer of formula (b-2) shown below.

The $^1$H-NMR data were as follows.
$^1$H-NMR: δ −0.10-0.21 (m, 93H), 0.41-0.58 (m, 2H), 1.54-1.69 (m, 2H), 1.88-1.93 (s, 3H), 3.36-3.45 (m, 2H), 3.60-3.67 (m, 2H), 4.22-4.29 (m, 2H), 5.50-5.55 (s, 1H), 6.09-6.13 (s, 1H)

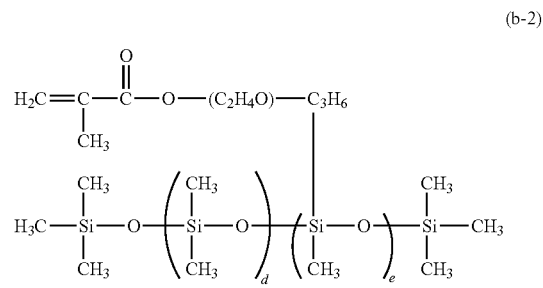

(b-2)

wherein d is 12 on average, and e is 1 on average.

Reference Example 2

<Preparation of Methacrylic-Modified Silicone Macromonomer (b-3)>

The procedures of Example 1 were repeated, except that the amounts of the starting materials were changed to 188 g for 1,1,1,3,3,5,5,7,7,7-decamethyltetrasiloxane, 449 g for 1,1,3,3,5,5,7,7-octamethylcyclotetrasiloxane, and 113 g for the 3-methacryloyloxypropyl methyldimethoxysilane oligomer (80 mm²/s). The product thus obtained had a yield of 625 g, a viscosity of 16 mm²/s, and a refractive index of 1.4098. ¹H-NMR analysis confirmed that the compound thus obtained was a methacrylic-modified silicone macromonomer of formula (b-3) shown below.

The ¹H-NMR data were as follows.

¹H-NMR: δ −0.10-0.21 (m, 93H), 0.41-0.58 (m, 2H), 1.59-1.75 (m, 2H), 1.87-1.93 (s, 3H), 4.01-4.09 (m, 2H), 5.49-5.54 (s, 1H), 6.04-6.09 (s, 1H)

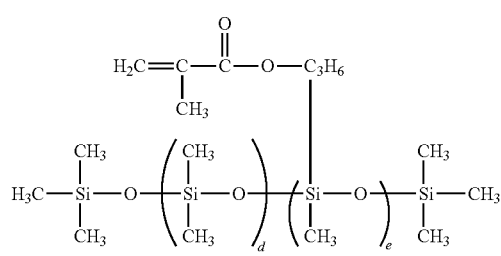

(b-3)

wherein d is 12 on average, and e is 1 on average.

Reference Example 3

<Preparation of a Mixture of Zinc Oxide and Polymerizable Monomers>

A reaction vessel, equipped with a stirrer, a temperature controller and an addition funnel, was charged with 85.4 g of n-butanol and 40.7 g of zinc oxide, and the temperature was raised to 75° C. while stirred. Then, a mixture of 43.1 g of methacrylic acid, 36.1 g of acrylic acid and 5.0 g of water was added dropwise at a constant rate over 3 hours from the addition funnel. After stirred for further 2 hours, 36 g of n-butanol was added to obtain a clear mixture having a solid content of 44.8 mass %.

Reference Example 4

<Preparation of Resin Composition (X-1)>

A reaction vessel, equipped with a stirrer, a temperature controller and an addition funnel, was charged with 59 g of xylene, 15 g of propyleneglycol monomethyl ether, and 4.0 g of ethyl acrylate, and the temperature was raised to 100° C. while stirred. Then, a mixture of 29.4 g of methyl methacrylate, 14.9 g of ethyl acrylate, 26 g of the mixture of zinc oxide and the polymerizable monomers obtained in Reference Example 1, 40 g of the methacrylic-modified silicone macromonomer (b-1), 10 g of xylene, 0.3 g of 2,2-azobis(isobutyronitrile), 10.7 g of 2,2-azobis(2-methyl-butyronitrile) (AMBN), and 1.0 g of a chain transfer agent (NOFMER® MSD from NOF Corporation, α-methyl styrene dimer) was added dropwise at a constant rate over 6 hours from the addition funnel. After completion of the dropwise addition, 0.5 g of t-butyl peroxyoctoate and 10 g of xylene were added in four aliquots at 30-minute intervals. After stirred for further one hour, 55 g of xylene was added to obtain a resin composition (X-1) in a form of solution having a solid content of 38.2 mass %.

Reference Example 5

<Preparation of Resin Composition (X-2)>

A resin composition (X-2) in a form of solution having a solid content of 45.1 mass % was obtained as in Reference Example 2, except that the methacrylic-modified silicone macromonomer (b-2) was used in place of the methacrylic-modified silicone macromonomer (b-1).

Reference Example 6

<Preparation of Resin Composition (X-3)>

A resin composition (X-3) in a form of solution having a solid content of 43.8 mass % was obtained as in Reference Example 2, except that the methacrylic-modified silicone macromonomer (b-3) was used in place of the methacrylic-modified silicone macromonomer (b-1).

Reference Comparative Example 7

<Preparation of Resin Composition (X-4)>

A resin composition (X-4) in a form of solution having a solid content of 45.4 mass % was obtained as in Reference Example 2, except that a methacrylic-modified silicone macromonomer of the formula (b-4) shown below was used in place of the methacrylic-modified silicone macromonomer (b-1).

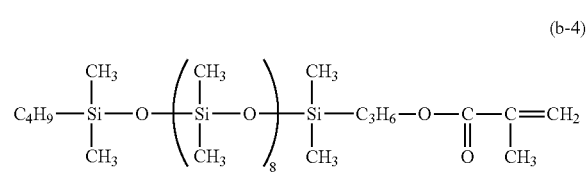

(b-4)

<Evaluation of the Coatings>

The coating formed from each of the resin compositions was evaluated on the surface smoothness, coating hardness and antifouling property. The results are shown in Table 1.

(Surface Smoothness)

A test specimen was prepared by applying the resin solution on a hard vinyl chloride plate of 50 mm×50 mm×2 mm (thickness) using an applicator in such an amount to yield a dry coating thickness of 120 μm, and then drying to form a coating. This test specimen was attached to a rotary drum, placed in artificial seawater and rotated at a peripheral speed of 7.7 m/s. A line roughness was measured on the coating after 100 days with a high accuracy geometry measurement system KS-1100, LT-9000 (manufactured by Keyence Corporation), and the surface smoothness was evaluated on the following criteria:

G: less than 1.0 μm;
B: 1.0 μm or larger.

(Coating Hardness)

The resin solution was applied on a glass substrate using a 500-μm applicator in such an amount to yield a dry coating thickness of 80 to 150 μm, and dried at 25° C. for a week to obtain a coating of the resin composition. A coating hardness was measured at 25° C. with an ultramicro hardness tester HM2000 (Fischer Instruments). The following conditions were used: constant dQRST(F)/dt, F (test force)=10 mN/10 s, C (creep time at maximum load)=5 s, maximum indentation load=10 mN, maximum indentation depth=6 μm. An average of hardness values at three different points of the coating was taken as the coating hardness, and evaluated on the following criteria:
E: 9.0 N/mm² or larger;
G: from 7.0 to 9.0 N/mm²;
B: less than 7.0 N/mm².
(Antifouling Property)

The resin solution was applied with a brush on both sides of a sandblasted steel plate which had been coated on both sides with a rust-proof paint, so as to have a dry coating thickness of 200 to 300 μm. The coated plate thus obtained was dried at the room temperature (25° C.) for 3 days, and then immersed still in seawater (1.0 m below the sea level) for 4 months in a bay of Aichi Prefecture, Japan. A proportion of the area on which marine organisms attached relative to the entire area of the plate was determined, and evaluated on the following criteria:
E: not larger than 5%;
G: larger than 5% to 60% s;
B: larger than 60%.

TABLE 1

| Resin Composition | (X-1) | (X-2) | (X-3) | (X-4) |
|---|---|---|---|---|
| Surface Smoothness | G | G | G | B |
| Coating Hardness | E | G | G | G |
| Antifouling Property | G | E | G | E |

INDUSTRIAL APPLICABILITY

The (meth)acrylic-modified silicone macromonomer according to the invention is useful as a raw material for a (meth)acrylic copolymer. It is particularly useful as a raw material for a (meth)acrylic copolymer which may be preferably used as a polymer in an antifouling paint to give an antifouling coating that exhibits excellent antifouling properties and surface smoothness.

The invention claimed is:

1. A (meth)acrylic-modified silicone macromonomer of the following formula (b1):

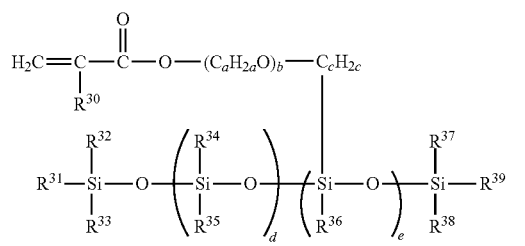

(b1)

wherein $R^{30}$ is a hydrogen atom or a methyl group; a is an integer of 2 to 5; b is an integer of 1 to 10; c is an integer of 2 or 3; d is an integer of 1 to 1,000; e is an integer of 1 to 80; and $R^{31}$-$R^{39}$ are, independently from each other, a substituted or unsubstituted monovalent hydrocarbon group having no (meth)acrylic group, or an alkoxy group.

2. The (meth)acrylic-modified silicone macromonomer according to claim 1, wherein e is an integer of 2 to 5.

3. The (meth)acrylic-modified silicone macromonomer according to claim 2, wherein e is 2.

4. The (meth)acrylic-modified silicone macromonomer according to claim 2 or 3, wherein a is an integer of 2 to 4, b is an integer of 1 to 10, c is 3, and d is an integer of 1 to 100.

5. The (meth)acrylic-modified silicone macromonomer according to claim 1, wherein e is 1, and b is an integer of 1 to 10.

6. The (meth)acrylic-modified silicone macromonomer according to claim 5, wherein a is an integer of 2 to 4, c is 3, and d is an integer of 1 to 100.

7. The (meth)acrylic-modified silicone macromonomer according to claim 1, wherein $R^{31}$-$R^{39}$ are, independently from each other, a methyl, phenyl, methoxy or ethoxy group.

8. The (meth)acrylic-modified silicone macromonomer according to any one of claim 1, 2, 3, 5, 6 or 7, for use as a raw material for a polymer used in an antifouling paint.

9. The (meth)acrylic-modified silicone macromonomer according to claim 8, wherein the antifouling paint is a marine antifouling paint.

10. An antifouling paint comprising a (meth)acrylic-(co)polymer having a monomer unit derived from polymerizing the (meth)acrylic-modified silicone macromonomer according to any one of claim 1, 2, 3, 5, 6 or 7.

11. A marine antifouling paint comprising a (meth)acrylic-(co)polymer having a monomer unit derived from polymerizing the (meth)acrylic-modified silicone macromonomer according to any one of claim 1, 2, 3, 5, 6 or 7.

* * * * *